(12) United States Patent
Hortop et al.

(10) Patent No.: US 7,862,943 B2
(45) Date of Patent: Jan. 4, 2011

(54) METHOD AND APPARATUS FOR STARTING A FUEL CELL ENGINE IN A VEHICLE EQUIPPED WITH AN ULTRACAPACITOR

(75) Inventors: Matthew K. Hortop, Rochester, NY (US); David John Keyes, Rochester, NY (US); Ellen Greifenstein, Darmstadt (DE); Kazuyuki Izawa, Hamamatsu (JP); Kengo Ikeya, Hamamatsu (JP)

(73) Assignee: GM Global Technology Operations, Inc., Detroit, MI (US)

( * ) Notice: Subject to any disclaimer, the term of this patent is extended or adjusted under 35 U.S.C. 154(b) by 228 days.

(21) Appl. No.: 12/184,766

(22) Filed: Aug. 1, 2008

(65) Prior Publication Data

US 2010/0028727 A1 Feb. 4, 2010

(51) Int. Cl.
*H01M 8/04* (2006.01)
(52) U.S. Cl. .................................. 429/429; 429/432
(58) Field of Classification Search .............. 429/12, 429/13, 22, 9, 429, 432; 180/65.2
See application file for complete search history.

(56) References Cited

U.S. PATENT DOCUMENTS

| | | | |
|---|---|---|---|
| 2006/0076171 A1* | 4/2006 | Donnelly et al. | 180/65.2 |
| 2006/0083965 A1* | 4/2006 | Rainville et al. | 429/22 |
| 2006/0127704 A1* | 6/2006 | Raiser | 429/9 |

* cited by examiner

*Primary Examiner*—Jonathan Crepeau
*Assistant Examiner*—Kenneth Douyette
(74) *Attorney, Agent, or Firm*—John A. Miller; Miller IP Group, PLC

(57) ABSTRACT

A hybrid fuel cell system that employs a fuel cell stack and an ultracapacitor. A diode is provided on a high voltage electrical bus between the fuel cell stack and the ultracapacitor so that high voltage from the ultracapacitor does not affect the operation of the fuel cell stack. During system start-up, a by-pass switch is closed to by-pass the ultracapacitor so that power from the ultracapacitor can be used to start various system loads, such as a cathode side air compressor that provides air to the fuel cell stack. A 12 volt-to-high voltage converter is employed to provide a low power, high voltage supply from a low voltage battery to the system loads at start-up when the by-pass switch is opened, but before a fuel cell stack switch is closed.

17 Claims, 2 Drawing Sheets

METHOD AND APPARATUS FOR STARTING A FUEL CELL ENGINE IN A VEHICLE EQUIPPED WITH AN ULTRACAPACITOR

BACKGROUND OF THE INVENTION

1. Field of the Invention

This invention relates generally to a hybrid fuel cell system including an ultracapacitor and a fuel cell stack and, more particularly, to a hybrid fuel cell system including an ultracapacitor and a fuel cell stack, where the system employs a start-up process that allows power from the ultracapacitor to operate system start-up components.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a supplemental power source in addition to the fuel cell stack, such as a high voltage DC battery or an ultracapacitor. The power source provides supplemental power for the various vehicle auxiliary loads, for system start-up and during high power demands when the fuel cell stack is unable to provide the desired power. The fuel cell stack provides power to an electrical traction motor through a DC high voltage electrical bus for vehicle operation. The battery provides supplemental power to the electrical bus during those times when additional power is needed beyond what the stack can provide, such as during heavy acceleration. For example, the fuel cell stack may provide 70 kW of power. However, vehicle acceleration may require 100 kW of power. The fuel cell stack is used to recharge the battery or ultracapacitor at those times when the fuel cell stack is able to provide the system power demand. The generator power available from the traction motor during regenerative braking is also used to recharge the battery or ultracapacitor.

In the hybrid vehicle discussed above, a bi-directional DC/DC converter is typically employed to step up the DC voltage from the battery to match the battery voltage to the electrical bus voltage dictated by the voltage output of the fuel cell stack and step down the stack voltage during battery recharging. However, DC/DC converters are relatively large, costly, heavy and unreliable, providing obvious disadvantages. It is desirable to eliminate the DC/DC converter from a fuel cell vehicle including a supplemental power source.

There have been various attempts in the industry to eliminate the DC/DC converter in fuel cell powered vehicles by providing a power source that is able to handle the large voltage swing from the fuel cell stack over the operating conditions of the vehicle. Certain types of batteries have also been used to eliminate the DC/DC converter in vehicle fuel cell systems. However, these systems are typically limited by the ability to discharge the battery beyond a certain level. In other words, these types of batteries could be damaged as a result of large voltage swings on the electrical bus during the operation of the system.

SUMMARY OF THE INVENTION

In accordance with the teachings of the present invention, a hybrid fuel cell system is disclosed that employs a fuel cell stack and an ultracapacitor. A diode is provided on a high voltage bus between the fuel cell stack and the ultracapacitor so that high voltage from the ultracapacitor does not affect the operation of the fuel cell stack. During system start-up, a by-pass switch is closed to by-pass the ultracapacitor so that power from the ultracapacitor can be used to start various system loads, such as a cathode side air compressor that provides air to the fuel cell stack. A 12 volt-to-high voltage converter is employed to provide a short duration, low power, high voltage supply from a low voltage battery to the system loads at start-up when the by-pass switch is opened, but before a fuel cell stack switch is closed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a hybrid fuel cell system and method for starting the system is merely exemplary in nature, and is in no way intended to limit the invention or its applications or uses.

Figure 1:
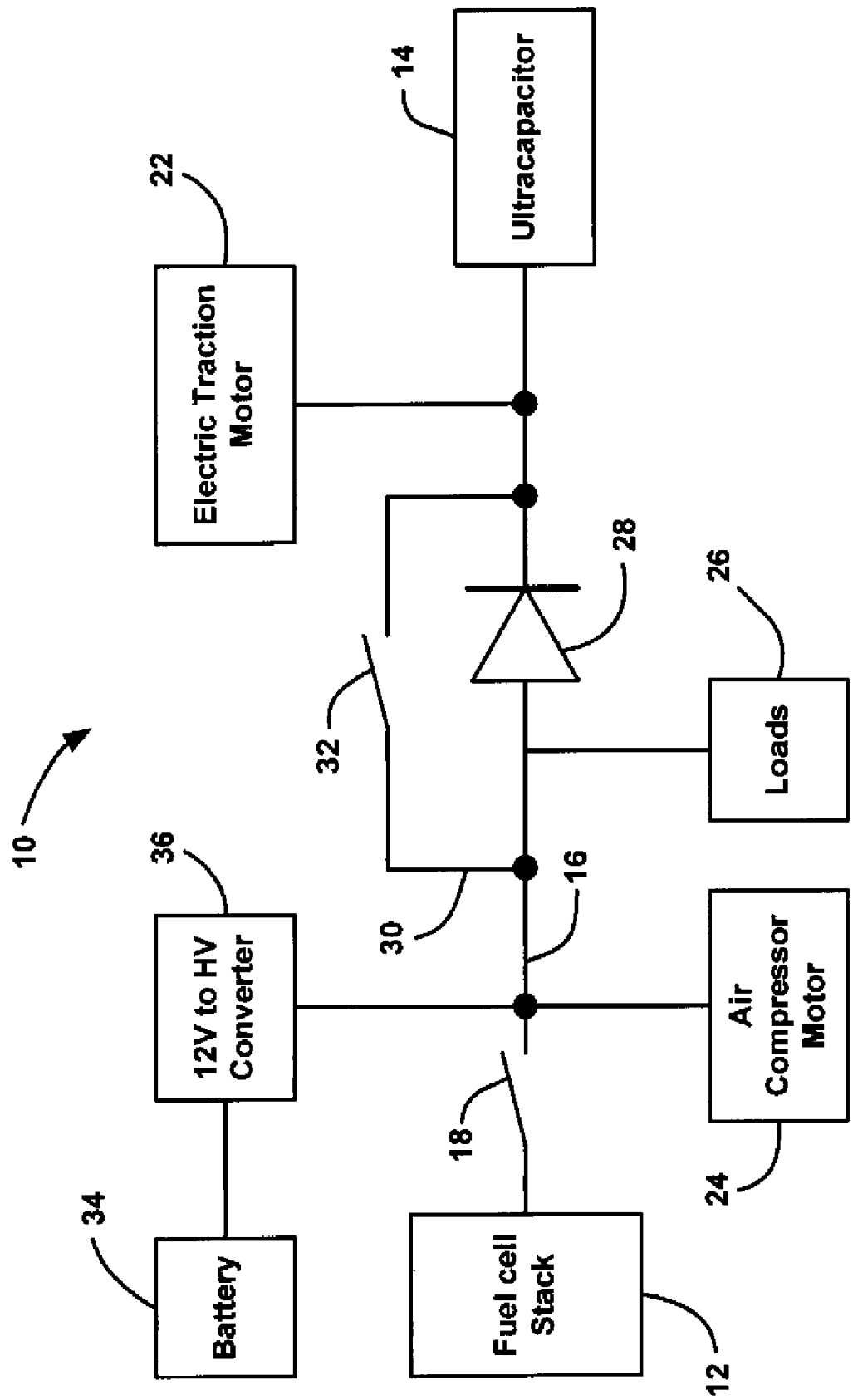
FIG. 1 is a schematic block diagram of a hybrid fuel cell system employing a fuel cell stack and an ultracapacitor, according to an embodiment of the present invention.

FIG. 1 is a schematic block diagram of a fuel cell system 10 including a fuel cell stack 12 and a ultracapacitor 14 both electrically coupled to a high voltage electrical bus 16. Although an ultracapacitor is employed in this non-limiting embodiment as a supplemental power source, other high voltage DC storage devices can be employed instead of the ultracapacitor 14, such as a high voltage battery. A fuel cell stack switch 18 selectively connects and disconnects the fuel cell stack 12 to the high voltage electrical bus 16. Various electrical components are electrically coupled to the high voltage electrical bus 16, such as an electric traction motor 22 that propels the vehicle. Additionally, a motor 24 that drives an air compressor for providing air to the cathode side of the fuel cell stack 12 and other system loads 26 are electrically coupled to the electrical bus 16.

The fuel cell stack 12 and the ultracapacitor 14 can have different output voltages, where the voltage of the ultracapacitor 14 is typically higher and could damage the fuel cell stack 12. The higher voltage on the ultracapacitor 14 may be a result of regenerative braking energy captured through the traction motor 22. As discussed above, DC/DC converters where typically provided in the high voltage electrical bus 16 to protect the fuel cell stack from the voltage of the high voltage DC power source. In this embodiment, a DC/DC converter is not employed. Therefore, some other technique is needed to protect the fuel cell stack 12. In order to provide this protection, a suitable high voltage diode 28 is provided in the high voltage electrical bus 16 that prevents the fuel cell stack 12 from seeing the high voltage of the ultracapacitor 14, in a manner that is well understood in the art. However, at system start-up, when the fuel cell stack 12 is not operating, the energy from the ultracapacitor 14 is necessary to operate various system loads, such as the air compressor motor 24.

In order to allow the DC voltage from the ultracapacitor 14 to drive the motor 24, it is necessary to by-pass the diode 28. Therefore, a by-pass line 30 is provided around the diode 28, and a by-pass switch 32 is provided in the by-pass line 30 so as to selectively allow the diode 28 to be by-passed. Therefore, during system start-up, the switch 18 is opened and the switch 32 is closed so that electrical energy from the ultracapacitor 14 can go around the diode 28 and drive the air compressor motor 24, and the other system loads 26, without damaging the fuel cell stack 12.

The fuel cell system 10 also includes a low voltage battery 34, such as a 12 volt car battery. The battery 34 can provide power to various system and vehicle components that do not require high voltage. However, during certain times, it is desirable to convert the 12 volt DC potential from the battery 34 to a high voltage low power potential to drive certain system components. To provide this conversion, a 12 volt to high voltage converter 36 is provided. The high voltage low power from the converter 36 can be used to drive the air compressor motor 24 to start the fuel cell stack 12 during those times when the ultracapacitor 14 may be dead or not have enough power to do so. Thus, this power source operates as a back-up system to the starting sequence using the ultracapacitor 14.

There is a narrow time window during system start-up when the ultracapacitor 14 is providing power to the air compressor motor 24 through the switch 32, and the fuel cell stack 12 starts providing stable power where it can be switched into the system 10. During this process, the switch 32 is opened so that the fuel cell stack 12 is protected from the power of the ultracapacitor 14 by the diode 28, and the switch 18 is then closed so that power from the fuel cell stack 12 can be provided on the high voltage electrical bus 16 to drive the various loads. During that narrow time window when both of the switches 18 and 32 may be open, power may not be provided to the air compressor motor 24, which may cause a temporary dip in the cathode air being provided to the fuel cell stack 12. During this time, the power from the high voltage converter 36 can maintain the air compressor motor 24 operational to provide a seamless transition between the opening of the switch 32 and the closing of the switch 18.

Figure 2:
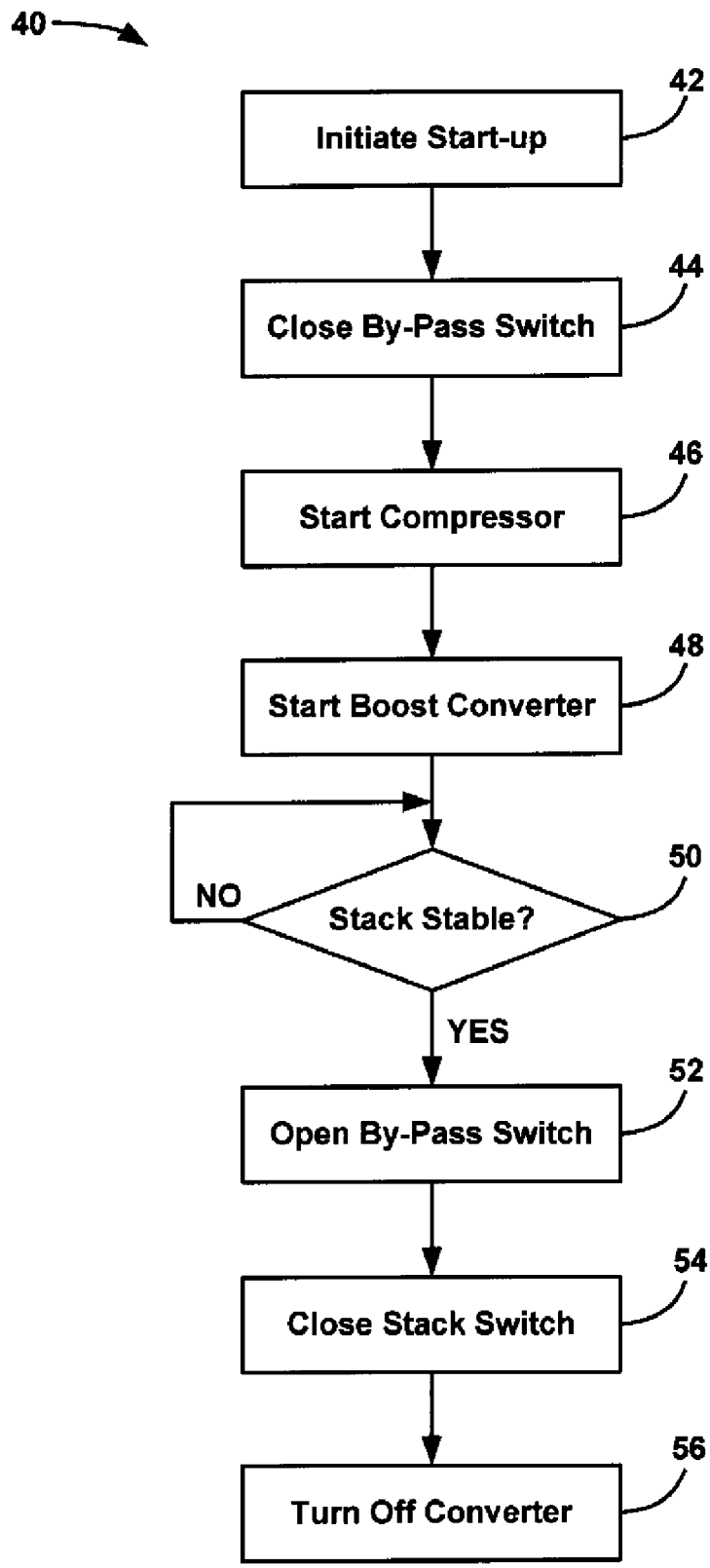
FIG. 2 is a flow chart diagram showing a start-up process for the fuel cell stack shown in FIG. 1 that employs a by-pass switch for by-passing a diode and a 12 volt-to-high voltage low power DC converter, according to an embodiment of the present invention.

This start-up sequence can be shown by flow chart diagram 40 in FIG. 2. The start-up sequence is initiated at box 42, such as by turning the vehicle ignition key on, and the start-up algorithm closes the by-pass switch 32 at box 44. The start-up algorithm then starts the compressor motor at box 46 and starts the boost converter 36 at box 48. The start-up algorithm then determines whether the output power of the fuel cell stack 12 is stable at decision diamond 50, and if not, returns to determine stack stability after a certain period of time has elapsed. If the stack output power is stable at the decision diamond 50, then the start-up algorithm opens the by-pass switch 32 at box 52 and closes the stack switch 18 at box 54. During the time that the switch 32 is opened and the switch 18 is closed, power is being provided to the compressor motor 24 by the boost converter 36. The start-up algorithm then turns off the boost converter 36 at box 56, where the system 10 should now be operating normally.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for starting a hybrid fuel cell system, said method comprising:

providing a high voltage electrical bus;

providing a fuel cell stack electrically coupled to the high voltage electrical bus;

providing a high voltage DC power storage device electrically coupled to the high voltage electrical bus;

providing a diode in the high voltage electrical bus that prevents voltage from the high voltage storage device from accessing the fuel cell stack;

providing a by-pass line around the diode;

providing a fuel cell stack switch between the fuel cell stack and the high voltage electrical bus;

electrically coupling system loads to the high voltage electrical bus;

electrically coupling a low voltage to high voltage boost converter to the high voltage electrical bus;

closing a by-pass switch in the by-pass line so that electrical power from the high voltage DC storage device goes around the diode and is able to operate the system loads;

starting the fuel cell stack using the system loads;

determining if an output voltage of the fuel cell stack is stable;

opening the by-pass switch if the fuel cell stack voltage is stable; and closing the fuel cell stack switch after the by-pass switch is opened.

2. The method according to claim 1 wherein providing a high voltage DC storage device includes providing an ultracapacitor.

3. The method according to claim 1 wherein operating the system loads includes operating an air compressor motor that provides power to an air compressor that drives air to the fuel cell stack.

4. The method according to claim 1 further comprising turning on the boost converter before opening the by-pass switch so as to allow the boost converter to be ready to provide power to the system loads when the by-pass switch is opened and the stack switch is closed.

5. The method according to claim 1 wherein electrically coupling system loads to the high voltage electrical bus includes electrically coupling an electric traction motor to the high voltage electrical bus.

6. The method according to claim 5 wherein the electric traction motor propels a vehicle.

7. The method according to claim 1 further comprising turning off the boost converter after the stack switch is opened.

8. The method according to claim 1 further comprising electrically coupling a 12 volt battery to the low voltage to high voltage boost converter to provide the low voltage.

9. A method for starting a hybrid fuel cell system, said method comprising;
electrically disconnecting a fuel cell stack from a high voltage electrical bus;
providing electrical power from a high voltage DC power storage device to a compressor motor on the high voltage electrical bus through a by-pass switch that by passes a diode in the electrical bus, said compressor motor driving a compressor that provides air to a cathode side of the fuel cell stack;
opening the by-pass switch after the stack voltage becomes stable;
closing a fuel cell stack switch to connect the fuel cell stack to the high voltage electrical bus after the by-pass switch is opened; and
providing electric power to the compressor motor from a low voltage to high voltage boost converter during the time that the by-pass switch is opened, but before the fuel cell stack switch is closed.

10. The method according to claim 9 wherein the high voltage DC storage device is an ultracapacitor.

11. The method according to claim 9 further comprising turning on the boost converter before opening the by-pass switch so as to allow the boost converter to be ready to provide power to system loads when the by-pass switch is opened and the stack switch is closed.

12. The method according to claim 9 further comprising electrically coupling a 12 volt battery to the low voltage to high voltage boost converter to provide the low voltage.

13. A fuel cell system comprising:
a high voltage electrical bus;
a compressor motor electrically coupled to the high voltage electrical bus;
a fuel cell stack electrically coupled to the high voltage electrical bus;
a fuel cell stack switch for selectively connecting and disconnecting the fuel cell stack to the high voltage electrical bus;
a high voltage DC power storage device electrically coupled to the high voltage electrical bus;
a diode in the high voltage electrical bus that prevents voltage from the high voltage storage device from accessing the fuel cell stack;
a by-pass line around the diode;
a by-switch in the by-pass line; and
a low voltage to high voltage boost converter electrically coupled to the high voltage electrical bus, said boost converter providing power to the compressor motor during system start-up after the by-pass switch is opened, but before the fuel cell stack switch is closed.

14. The system according to claim 13 wherein the high voltage DC storage device is an ultracapacitor.

15. The system according to claim 13 wherein the boost converter is turned on before opening the by-pass switch so as to allow the boost converter to be ready to provide power to system loads when the by-pass switch is opened and the stack switch is closed.

16. The system according to claim 13 further comprising a 12 volt battery electrically coupled to the low voltage to high voltage boost converter.

17. The system according to claim 13 further comprising an electric traction motor electrically coupled to the high voltage electrical bus.

* * * * *